United States Patent
Rathi et al.

(10) Patent No.: US 10,599,334 B2
(45) Date of Patent: Mar. 24, 2020

(54) USE OF CAPI-ATTACHED STORAGE AS EXTENDED MEMORY

(71) Applicant: International Business Machines Corporation, Armonk, NY (US)

(72) Inventors: Sanket Rathi, Hyderabad (IN); Bruce Mealey, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/005,998

(22) Filed: Jun. 12, 2018

(65) Prior Publication Data

US 2019/0377492 A1 Dec. 12, 2019

(51) Int. Cl.
  *G06F 3/06* (2006.01)
  *G06F 12/02* (2006.01)

(52) U.S. Cl.
  CPC .......... *G06F 3/0604* (2013.01); *G06F 3/0655* (2013.01); *G06F 3/0683* (2013.01); *G06F 12/0223* (2013.01)

(58) Field of Classification Search
  CPC .... G06F 3/0604; G06F 3/0655; G06F 3/0683; G06F 3/0601; G06F 12/0223
  See application file for complete search history.

(56) References Cited

U.S. PATENT DOCUMENTS 8,037,250 B1*  10/2011  Barreh ................ G06F 12/0842
                                                    711/125
2017/0115921 A1*  4/2017  Mealey ................ G06F 3/0631
2017/0132083 A1*  5/2017  Aslot .................. G06F 11/1402
2017/0168736 A1   6/2017  Batra et al.
2017/0293428 A1  10/2017  Radovanovic

OTHER PUBLICATIONS

Brech, B., Rubio, J. and M. Hollinger, "Data Engine for NoSQL IBM Power Systems Editions," Apr. 2015, available: https://www.ibm.com/downloads/cas/WY85Y82J.*
Brech Brad et al. "Data Engine for NoSQL—IBM Power Systems™ Edition," https://www-304.ibm.com/webapp/set2/sas/f/capi/CAPI_FlashWhitePaper.pdf, Oct. 15, 2014, 10 pages.

* cited by examiner

*Primary Examiner* — Tracy A Warren
(74) *Attorney, Agent, or Firm* — Patterson + Sheridan, LLP (57) ABSTRACT

Improved techniques for memory expansion are provided. A storage volume is opened on a storage device attached to a computing system, and the storage volume is configured as extended memory. A number of hardware threads available in the computing system are determined, and a number of contexts equal to the determined number of hardware threads are generated. Each context is assigned to one of the hardware threads. It is further determined that a first hardware thread has requested a first page that has been paged to the storage volume, where the first hardware thread is assigned a first context. A synchronous input output (I/O) interface is accessed to request that the first page be moved to memory, based on the first context. While the first page is being moved to memory, a priority of the first hardware thread is reduced.

19 Claims, 6 Drawing Sheets

USE OF CAPI-ATTACHED STORAGE AS EXTENDED MEMORY

BACKGROUND

The present invention relates to memory management, and more specifically, to utilizing optimized storage interfaces to extend system memory.

Computing systems rely on memory (sometimes generically referred to as "main memory" or as random access memory, or RAM) for storing data that is currently being operated on by applications, operating systems, and the like. Preferably, the memory is a relatively fast method of storage that provides rapid input and output. Generally, increasing the size of the available memory also improves the functioning of the computer. However, memory sizes are limited by a variety of factors. Many computing systems have a limited number of slots that can accept memory. Many systems are similarly limited in what range of memory can be physically addressed by the processor. Further, even without such limitations, memory is a relatively expensive form of storage, which may make it impractical to continuously purchase more. Additionally, other cheaper and more expandable options (such as external hard drives) are unsuitable for use as memory because of the relatively slow I/O they provide, as compared to memory.

SUMMARY

According to one embodiment of the present disclosure, a method is provided. The method includes opening a storage volume on a storage device attached to a computing system, and configuring the storage volume as extended memory. The method further includes determining a number of hardware threads available in the computing system, generating a number of contexts equal to the determined number of hardware threads, and assigning each context to one of the hardware threads. Additionally, the method includes determining that a first hardware thread has requested a first page that has been paged to the storage volume, wherein the first hardware thread is assigned a first context. The method also includes accessing a synchronous input output (I/O) interface to request that the first page be moved to memory, based on the first context, and while the first page is being moved to memory, reducing a priority of the first hardware thread.

According to a second embodiment of the present disclosure, a computer program product is disclosed. The computer program product includes a computer-readable storage medium having computer-readable program code embodied therewith, the computer-readable program code executable by one or more computer processors to perform an operation. The operation includes opening a storage volume on a storage device attached to a computing system, and configuring the storage volume as extended memory. The operation further includes determining a number of hardware threads available in the computing system, generating a number of contexts equal to the determined number of hardware threads, and assigning each context to one of the hardware threads. Additionally, the operation includes determining that a first hardware thread has requested a first page that has been paged to the storage volume, wherein the first hardware thread is assigned a first context. The operation also includes accessing a synchronous input output (I/O) interface to request that the first page be moved to memory, based on the first context, and while the first page is being moved to memory, reducing a priority of the first hardware thread.

According to a third embodiment of the present disclosure, a system is disclosed. The system includes one or more computer processors, and a memory containing a program which when executed by the one or more computer processors performs an operation. The operation includes opening a storage volume on a storage device attached to a computing system, and configuring the storage volume as extended memory. The operation further includes determining a number of hardware threads available in the computing system, generating a number of contexts equal to the determined number of hardware threads, and assigning each context to one of the hardware threads. Additionally, the operation includes determining that a first hardware thread has requested a first page that has been paged to the storage volume, wherein the first hardware thread is assigned a first context. The operation also includes accessing a synchronous input output (I/O) interface to request that the first page be moved to memory, based on the first context, and while the first page is being moved to memory, reducing a priority of the first hardware thread.

DETAILED DESCRIPTION

Embodiments of the present disclosure provide methods, systems, and computer program products that enable the attachment and configuration of storage devices in a way that allows for them to be used as extended memory for computing systems. In embodiments, the manner in which the storage device is configured provides far faster access than other existing methods, and is sufficiently fast to be used to extend the memory available in the system. Similarly, in embodiments, this extended memory is readily expandable to sizes far exceeding what is available in traditional solutions. This dramatic increase in available memory can significantly improve the functioning of the computing system.

In an embodiment of the present disclosure, a storage device (such as flash memory, a solid state drive (SSD), and the like) can be attached via an optimized interface that allows the device to directly access the memory of the system. For example, in one embodiment, the device is attached to the computing system utilizing a Coherent Accelerator Processor Interface, or CAPI, developed by International Business Machines® of Armonk, N.Y. In an embodiment, the storage device is attached using an optimized interface that allows for direct access to the memory of the system. In embodiments, CAPI-attached devices and the CPU(s) on the computing system share the same coherent memory space. Because the CPU and CAPI-attached devices share the same memory space, low latency and high bandwidth can be achieved as no direct memory access mapping or memory shuffling is needed between the CPU and the CAPI-attached device. In some embodiments, the processor(s) and application(s) executing on the computing system see the attached storage device as memory, rather than as an attached input/output (I/O) device. In an embodiment, an optimized driver on an interface with the device (as opposed to a software driver operating on the computing system) provides rapid access to the storage device when requested.

In order to provide additional memory, some systems utilize paging, which involves transferring unused segments or pages to paging devices via traditional I/O interfaces. This transfer is slow, however, which reduces the efficiency of the system. Similarly, some systems utilize in-memory compression to dynamically compress portions of memory, and "page" memory into and out of these compressed blocks as needed. However, these systems require either additional hardware to perform the compression and decompression, or require resources from the processor(s), which may negatively impact other processes or applications. In embodiments of the present disclosure, rather than transferring segments or pages out to a paging device or compressing them in memory, pages are transferred to and from the extended memory (e.g., a storage volume on a device attached via CAPI). In an embodiment, the storage device or computing system includes a driver (such as a CAPI Flash driver) that handles the transfer. This interface is streamlined and allows for rapid transfer.

Figure 1:
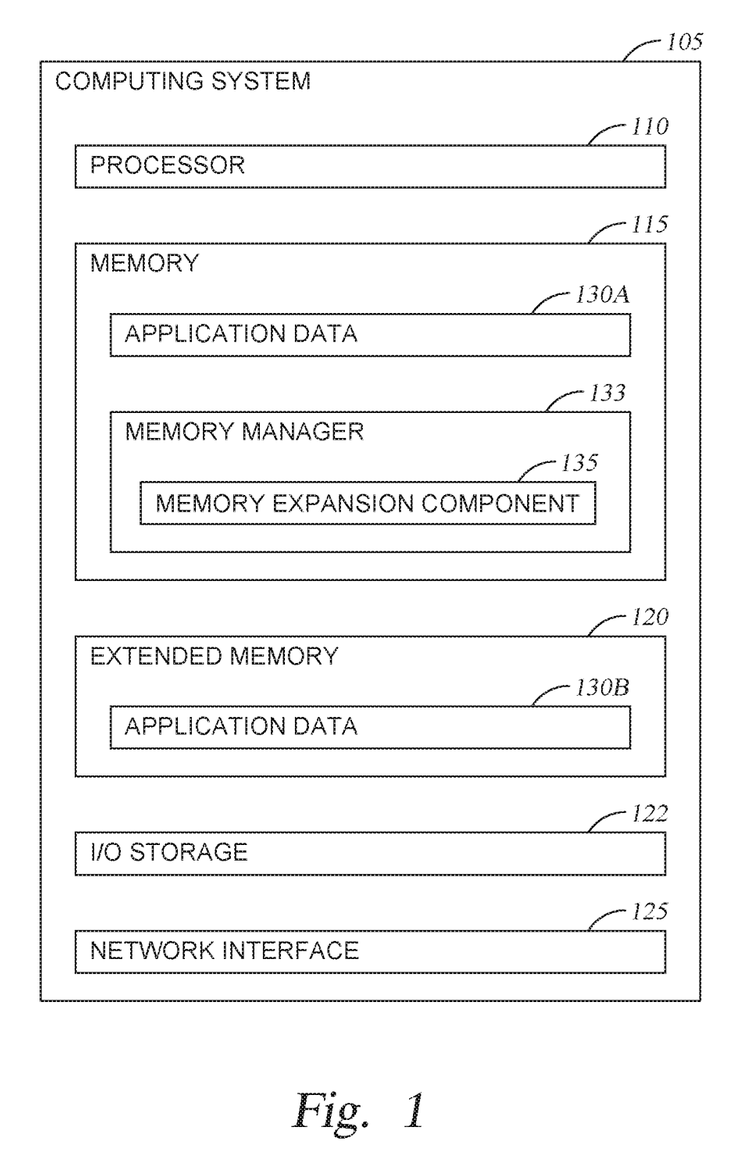
FIG. 1 is a block diagram illustrating a computing system configured to utilize extended memory, according to one embodiment disclosed herein.

FIG. 1 is a block diagram illustrating a Computing System 105 configured to utilize extended memory, according to one embodiment disclosed herein. As illustrated, the Computing System 105 includes a Processor 110, a Memory 115, Extended Memory 120, I/O Storage 122, and a Network Interface 125. In the illustrated embodiment, Processor 110 retrieves and executes programming instructions stored in Memory 115 as well as stores and retrieves application data residing in I/O Storage 122. Processor 110 is representative of a single CPU, multiple CPUs, a single CPU having multiple processing cores, and the like. Memory 115 is generally included to be representative of a random access memory. Through the Network Interface 125, the Computing System 105 may be communicatively coupled with other devices, for example, via the Internet.

Extended Memory 120 generally represents a logical storage volume (also referred to as a LUN) on a storage device, such as an SSD, attached via an optimized interface that enables direct access between the Extended Memory 120 and the Memory 115. In embodiments, the I/O Storage 120 is configured for traditional I/O use, and may be a disk drive or flash-based storage device, may include fixed and/or removable storage devices, such as fixed disk drives, removable memory cards, or optical storage, network attached storage (NAS), or storage area-network (SAN). In some embodiments, the I/O Storage 122 may also comprise a storage volume or LUN on a device attached via an optimized interface, similarly to the Extended Memory 120. In some embodiments, the Extended Memory 120 and I/O Storage 122 may operate as separate LUNs on the same storage device. In an embodiment, the Extended Memory 120 and I/O Storage 122 are differentiated by the configuration selected when the respective volumes were opened, as will be discussed in more detail below.

In the illustrated embodiment, during execution, Application Data 130A resides in Memory 115. For example, as applications are executed by the Processor 110, their data may be stored in the Memory 115. In the illustrated embodiment, the Memory 115 also includes a Memory Manager 133, which manages the memory of the Computing System 105. In some embodiments, the Memory Manager 133 may operate as a hypervisor (or as a component of a hypervisor) to manage virtual to physical memory mappings for one or more logical partitions (LPARs). In some embodiments, the Memory Manager 133 handles the opening and configuration of LUNs as Extended Memory 120 and/or I/O Storage 122, as will be discussed in more detail below. As illustrated, the Memory Manager 133 also includes a Memory Expansion Component 135, which is used to control the transfer of pages between the main Memory 115 and Extended Memory 120 as needed.

In one embodiment, the Memory Expansion Component 135 operates in a similar fashion to IBM's Active Memory Expansion (AME), which dynamically transfers data between a compressed pool and an uncompressed pool in memory. Rather than compressing the data, however, in an embodiment, the Memory Expansion Component 135 calls an application programming interface (API) of the Extended Memory 120 (e.g., a CAPI Flash driver) to transfer the page to or from the Extended Memory 120. That is, in an embodiment, the Memory Expansion Component 135 monitors segment or page access on the Computing System 105 and transfers pages from Extended Memory 120 into Memory 115 if they are needed. Similarly, the Memory Expansion Component 135 transfers pages from Memory 115 to Extended Memory 120 if additional space is needed in Memory 115 (e.g., if a page needs to be transferred in, or if a new application or LPAR is initialized). Thus, in an embodiment, while the Memory Manager 13 may maintain a mapping between virtual addresses used by applications and LPARs and the physical addresses in Memory 115, the Memory Expansion Component 135 may maintain a separate mapping between Memory 115 and the attached Extended Memory 120, in order to determine the location of each page.

Thus, as illustrated, some Application Data 130B reside in the Extended Memory 120. In an embodiment, the Application Data 130B includes pages which are used less frequently, or which have not been accessed for a predefined period of time, and were thus transferred out of main Memory 115 by the Memory Expansion Component 135. If a page in Extended Memory 120 is requested by an entity on the Computing System 105 (e.g., by an application, which may be operating on an LPAR), the Memory Expansion Component 135 transfers it into Memory 115, which may require transferring one or more pages from Memory 115 to the Extended Memory 120. In some embodiments, the Computing System 105 may also make use of one or more other related techniques to acquire additional memory space, such as using traditional paging devices, storing data in I/O Storage 122, and the like.

In an embodiment, when the Extended Memory 120 is initialized and opened (e.g., by the Memory Manager 133), it is configured in an "extended memory" mode, rather than a traditional I/O mode. In such an embodiment, the Extended Memory 120 operates with optimized kernel interfaces and is not available for traditional I/O. For example, while traditional I/O requires APIs that interact with upper layers of the file system, the optimized interface requires only lower level APIs that read and write directly to and from the Memory 115 and Extended Memory 120, utilizing physical hardware addresses and virtual addresses represented in a mapping. Similarly, in embodiments, this optimized interface provides synchronous access, while a traditional I/O interface is asynchronous. In some embodiments, upon opening a logical storage unit (also referred to as a LUN) in the Extended Memory 120, a different context is generated for each hardware thread on the system, as will be discussed in more detail below. In an embodiment, this allows for synchronous storage with lockless access to reduce latency. For traditional I/O interfaces (which provide asynchronous access), this one-to-one mapping does not exist, and thus lockless I/O is not possible. In some embodiments, a single storage device may have multiple LUNs opened on it. In some embodiments, each LUN may be opened in either extended memory mode or I/O mode, even within a single device.

Figure 2:
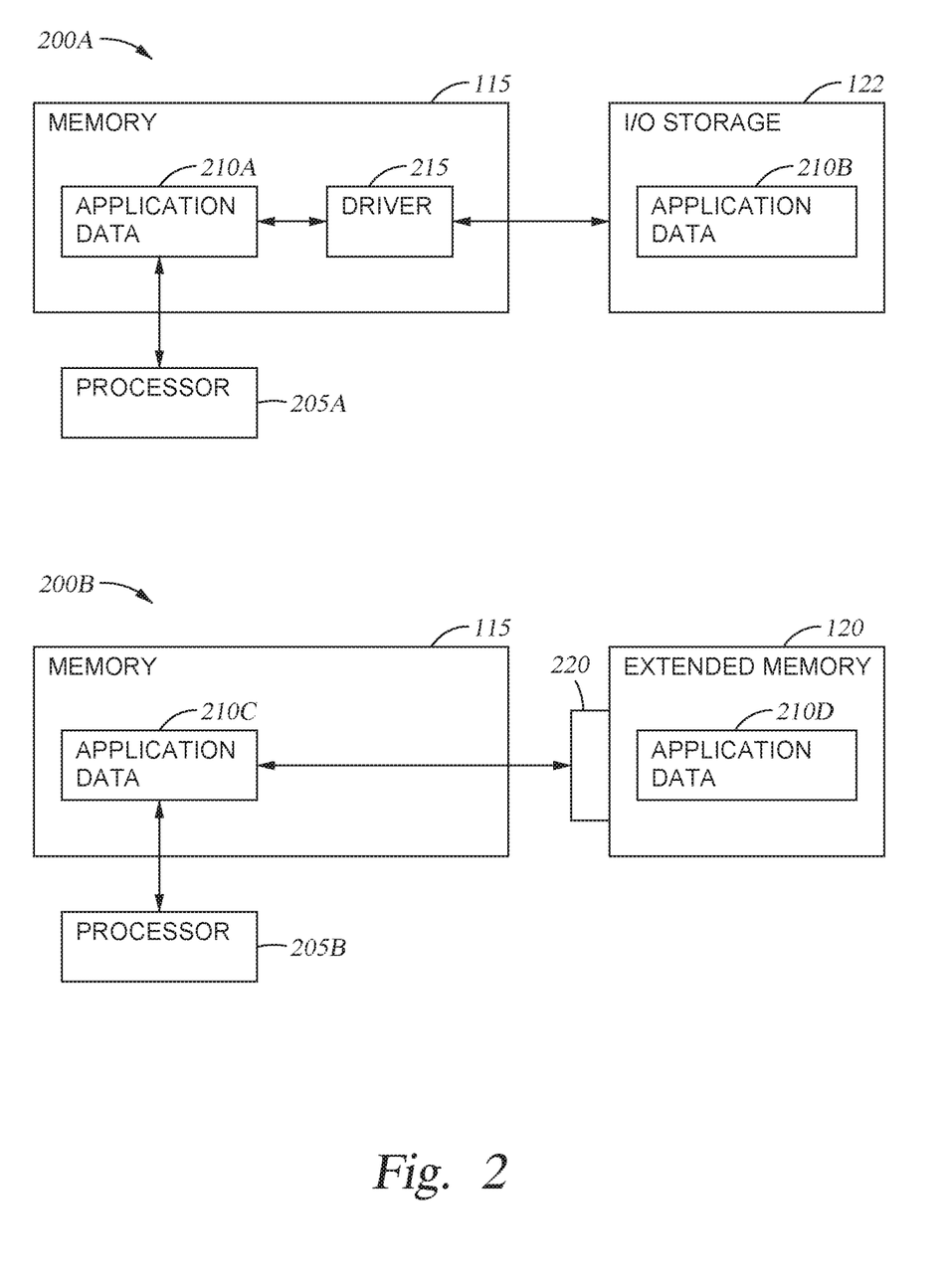
FIG. 2 illustrates two systems configured to make use of memory expansion in different ways, according to one embodiment disclosed herein.

FIG. 2 illustrates two systems 200A and 200B configured to make use of memory expansion in different ways, according to one embodiment disclosed herein. In the illustrated embodiment, the system 200A is configured to use a traditional paging device, such as I/O Storage 122, while the system 200B is configured to use Extended Memory 120 attached using optimized interfaces, as described herein. As illustrated, the system 100A must use a software Driver 215 to transfer Application Data 210A and 210B between Memory 115 and I/O Storage 122. For example, suppose Application Data 210A corresponds to address space reserved for a particular logical partition (LPAR). In order to transfer the data to I/O Storage 122, the Processor 205A must first copy the data to the address space used by the Driver 215, which then copies it to the I/O Storage 122. This process is duplicative and uses significant computing resources, which increases the latency and resource usage of the process. Further, even if this duplicative copying is removed, the use of the I/O Storage 122 requires more complex APIs and additional instructions which can delay the transfer.

In contrast, when the system 200B moves data to and from the Extended Memory 120, an optimized Interface 220 is used which utilizes streamlined APIs. In the illustrated embodiment, the Interface 220 can read and write directly from Memory 115, as well as Extended Memory 120, which dramatically improves the latency and throughput of the system. As discussed above, in some embodiments, the Interface 220 is a CAPI Flash adapter. In embodiments, CAPI adapters do not require translation control entry (TCE) to access memory, as the adapter contains its own address translations and exception generation logic. This allows the CAPI device to access memory directly using the segment table and hardware page table. In an embodiment, the Interface 220 uses a segment table that maps all of Memory 115 for I/O, which reduces the I/O path and improves latency involved in transferring data to and from the Extended Memory 120. As illustrated, the Extended Memory 120 is coherent because it access Memory 115 directly, without the need for intermediaries like the Driver 215. Further, because a separate context is generated for each hardware thread in the Computing System 105, the Extended Memory 120 provides lockless I/O.

Figure 3:
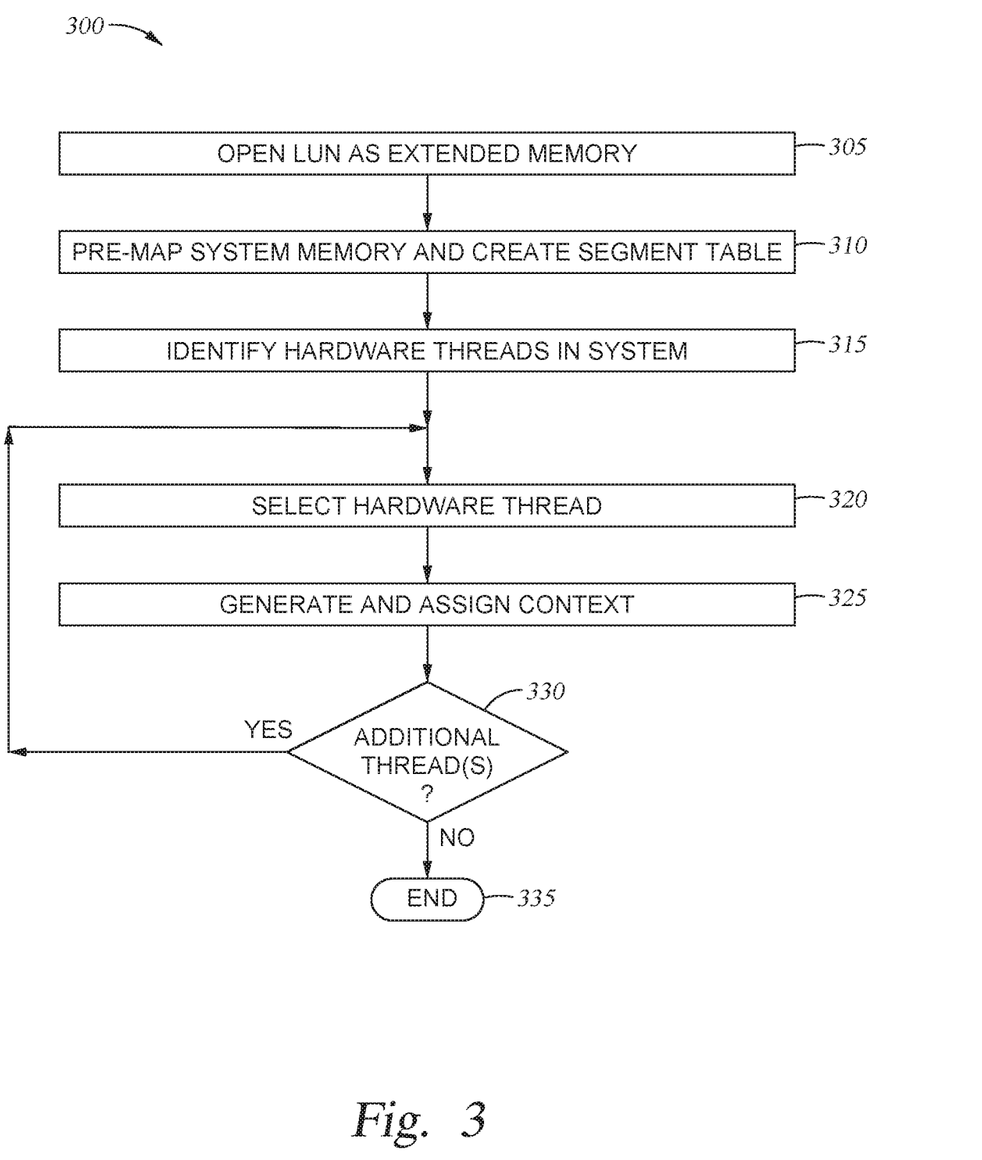
FIG. 3 is a flow diagram illustrating a method of opening a storage volume for extended memory, according to one embodiment disclosed herein.

FIG. 3 is a flow diagram illustrating a method 300 of opening a storage volume for extended memory, according to one embodiment disclosed herein. The method 300 begins at block 305, where the Memory Manager 133 opens a LUN as extended memory. As discussed above, in embodiments, for the LUN to operate as extended memory, it must reside on a storage device that is attached via an optimized hardware interface, such as CAPI. Further, as discussed above, in an embodiment, opening the LUN in extended memory mode involves configuring the LUN to utilize optimized interface(s) that operate on a lower level of the file system, and provide synchronous and lockless access to the LUN. In various embodiments, the LUN may be opened by an operating system or other application executing on the Computing System 105, by Memory Manager 133, by the Memory Expansion Component 135, by a user or administrator, or by another entity. The method 300 proceeds to block 310, where the Memory Manager 133 generates a pre-mapping of the system Memory 115.

In an embodiment, generating the pre-mapping involves generating a segment table that maps all of the system Memory 115 for I/O. In one embodiment, the segment table includes a mapping from the entire physical address range in Memory 115 to a virtual address space of the main Memory 115, which is used by the CAPI adapter (i.e., Interface 220) to access the Memory 115. As the Interface 220 works based on the virtual address space of the system, this segment table allows the Interface 220 to map the virtual addresses to the physical address space of the Memory 115. In an embodiment, this mapping is distinct from the mappings maintained by either the Memory Manager 133 or the Memory Expansion Component 135. The method 300 then continues to block 315, where the Memory Manager 133 identifies all of the hardware threads in the Computing System 105. In an embodiment, a hardware thread refers to a processing core. For example, if the Computing System 105 has one processor with four cores, there are four hardware threads in the system. Similarly, if the Computing System 105 includes two processors, each with four cores, there are eight hardware threads in the Computing System 105. Once the Memory Manager 133 has identified all of the available hardware threads, the method 300 proceeds to block 320. In some embodiments, rather than the Memory Manager 133 identifying the hardware threads, the Interface 220 of the storage device queries the kernel service to identify each hardware thread.

At block 320, the Memory Manager 133 selects a first hardware thread of the Computing System 105. In some embodiments, the Interface 220 instead selects a hardware thread. The method 300 then proceeds to block 325, where the Memory Manager 133 generates and assigns a context to the selected hardware thread. However, in some embodiments, the Interface 220 instead generates the contexts for each hardware thread and associates each thread with a context. In an embodiment, the context includes any queues and other information that the Interface 220 needs to transfer pages to and from Memory 115. For example, in an embodiment, each of the generated contexts includes a respective queue pair. In one embodiment, each respective queue pair includes a submission queue and a response queue. To send a command to an adapter (such as Interface 220), it is placed in the submission queue. Once the request is completed, the response is placed in the response queue. In an embodiment, the generated context also includes the pre-mapping (i.e., the segment table) that was generated in block 310 above. In an embodiment, rather than include the entire segment table, the context includes an indication of the segment table, such as an address where the segment table can be located. The method 300 then continues to block 330, where it is determined whether there are additional hardware threads in the system.

If there is at least one more additional hardware thread, the method 300 returns to block 320, where the Memory Manager 133 or Interface 220 selects the next hardware thread. If not, the method 300 terminates at block 335. In this way, each hardware thread in the Computing System 105 has its own context generated and associated with it. In an embodiment, each context therefore has its own respective queue pair. In some embodiments, the pre-mapped segment table is shared across all contexts. That is, in an embodiment, each of the contexts utilize the same segment table for translation between physical addresses in Memory 115 and a system-wide virtual address provided to identify the page that is to be transferred. In some embodiments, the segment table is generated when the LUN is opened, and remains static during operation. After the completion of the method 300, whenever a request to transfer a page to or from Extended Memory 120 is received, the Interface 220 can identify the context associated with the request (i.e., based on the hardware thread that requested the transfer), and use that context to transfer the requested page.

Figure 4:
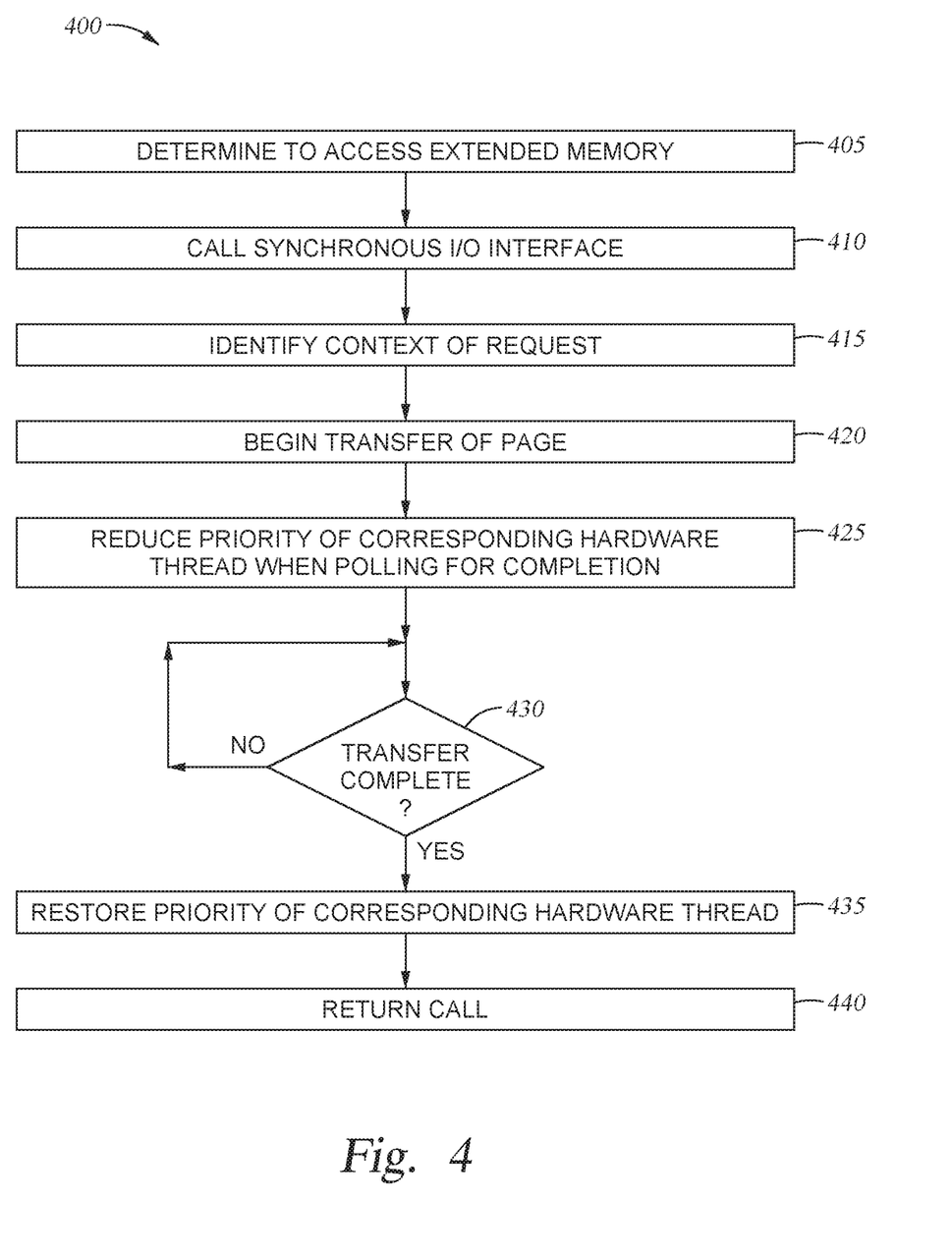
FIG. 4 is a flow diagram illustrating a method of using an extended memory storage volume, according to one embodiment disclosed herein.

FIG. 4 is a flow diagram illustrating a method 400 of using an extended memory storage volume, according to one embodiment disclosed herein. The method begins at block 400, where the Memory Expansion Component 135 determines to access Extended Memory 120. As discussed above, in an embodiment, the Memory Expansion Component 135 monitors when pages are accessed or requested by the various applications and LPARs that may be executing on the Computing System 105. When a page that is currently residing in the Extended Memory 120 is requested (as reflected in the mapping maintained by the Memory Expansion Component 135), the Memory Expansion Component 135 may determine that the Extended Memory 120 needs to be accessed to retrieve the page. Similarly, in an embodiment, when additional space is needed in Memory 115, the Memory Expansion Component 135 may determine that one or more of the pages in Memory 115 should be moved to the Extended Memory 120. Thus, in an embodiment, block 405 may represent a determination to transfer one or more pages to or from Extended Memory 120, or to both transfer one or more pages in, and to transfer one or more pages out.

The method 400 then proceeds to block 410, where the Memory Expansion Component 135 calls the synchronous I/O Interface 220 to request transfer of the identified page(s). At block 415, the Interface 220 (or an optimized driver therein) identifies the context corresponding to the request. For example, as discussed above, in an embodiment, the Interface 220 may determine which hardware thread requested the page be transferred, and identify the corresponding associated context which was generated and associated with the thread when the LUN was opened. The method 400 then proceeds to block 420, where the Interface 220 begins transfer of the page using the identified context. For example, as discussed above, the Interface 220 may utilize the page table associated with the identified context to determine the relevant address(es), and may utilize the queue pair to facilitate the transfer.

The method 400 continues to block 425, where the Interface 220 reduces the priority of the hardware thread that requested the transfer. For example, in an embodiment, the Interface 220 (or a driver therein) may access a service provided by the kernel and/or operating system to reduce the simultaneous multi-thread (SMT) priority of the hardware thread. In this way, although the transfer is performed synchronously and continues spinning until completion, it is lockless and the reduction in the priority of the thread prevents interference or delay of other hardware threads that are executing on the Computing System 105. At block 430, the Interface 220 determines whether the transfer has been completed. If not, the method 400 continues to loop until the transfer completes. Of course, in embodiments, other hardware threads may continue to operate normally, and the transfer is lockless. Thus, in some embodiments, one or more other hardware threads may also initiate a transfer to or from Extended Memory 120, and may therefore also enter this loop until their respective transfers are completed.

Once the transfer is completed, the method 400 continues to block 435, where the Interface 220 resets the priority of the hardware thread, and at block 440, the call is returned to the Memory Expansion Component 135 so that normal operation can resume. As discussed above, in some embodiments, the Interface 220 is configured to provide both optimized access to Extended Memory 120, as well as traditional I/O access for ordinary storage. Thus, in some embodiments, a single storage hardware device may include multiple LUNs, each of which may be configured for either extended memory use or for traditional storage use. In an embodiment, because the extended memory configuration involves lockless synchronous transfers, the other LUN(s) can continue to operate as normally.

Figure 5:
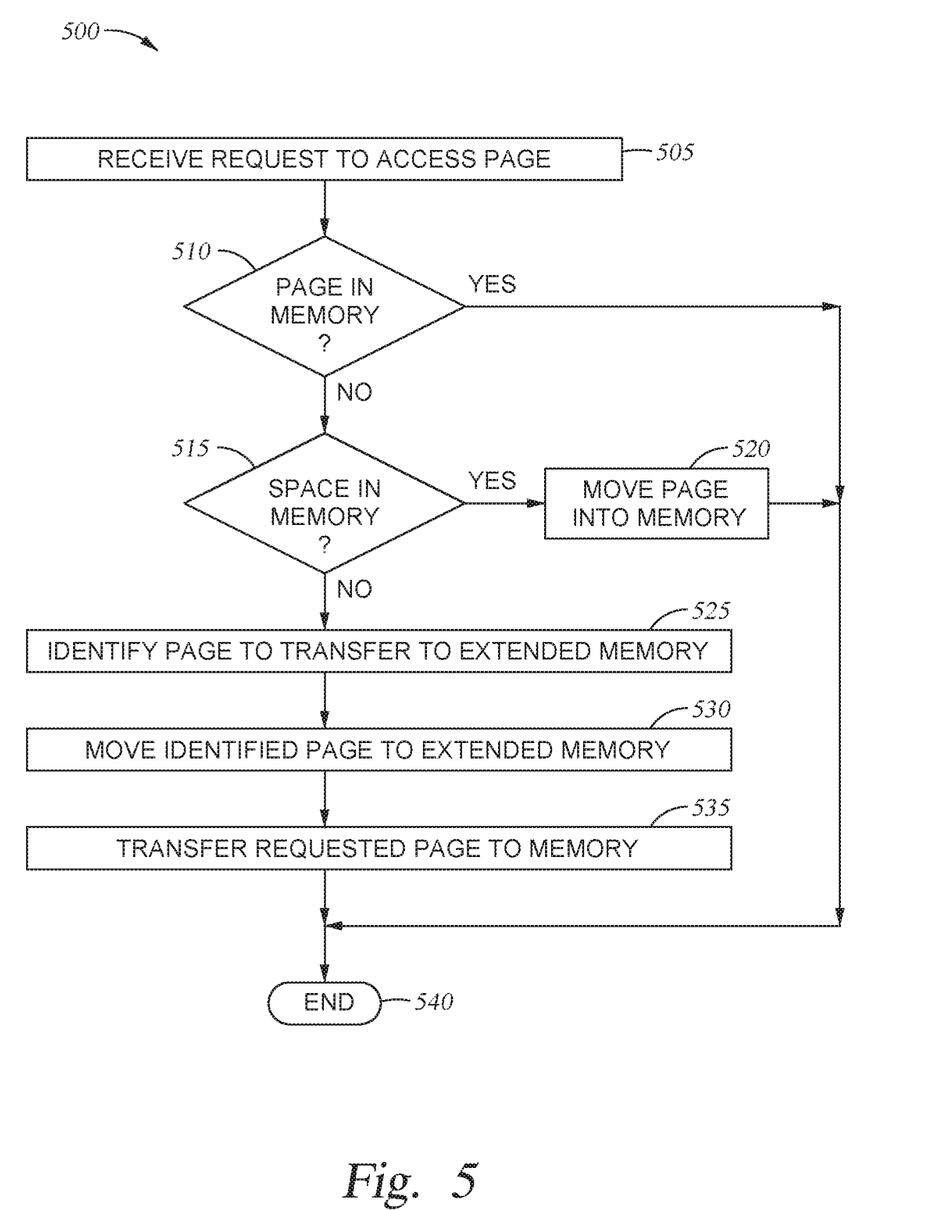
FIG. 5 is a flow diagram illustrating a method of using an extended memory storage volume, according to one embodiment disclosed herein.

FIG. 5 is a flow diagram illustrating a method 500 of using an extended memory storage volume, according to one embodiment disclosed herein. In the illustrated embodiment, the method 500 begins at block 505, where the Memory Manager 133 receives a request to access a page. As discussed above, this request may be initiated by an application, program, LPAR, or other entity. Similarly, as discussed above, in some embodiments, the Memory Manager 133 may generally maintain a mapping to perform translations between the virtual address provided by the requesting entity and the hardware address in Memory 115 where the page is located. At block 510, the Memory Manager 133 or Memory Expansion Component 135 determines whether the requested page is currently in Memory 115. To do so, as discussed above, the Memory Expansion Component 135 may maintain a separate mapping that indicates where each page or block is currently stored. If the page is available in Memory 115, the Memory Manager 133 returns the requested page (or an address of the page), and the method 500 ends.

If the page is currently residing in the Extended Memory 120, the Memory Expansion Component 135 determines whether there is sufficient space in Memory 115 for the page. If so, the method 500 proceeds to block 520, where the Memory Expansion Component 135 moves the identified page from Extended Memory 120 to Memory 115. In some embodiments, determining whether there is sufficient space in Memory 115 involves determining whether the space in Memory 115 that is allocated to the requesting entity has sufficient space. As discussed above, the transfer may involve calling an API of the Interface 220 to facilitate the transfer. Finally, when the call is returned (indicating that the transfer was completed), the Memory Manager 133 returns an indication of the page to the requesting entity, and the method 500 terminates at block 540.

Returning to block 515, if the page is in Extended Memory 120 and there is not sufficient space in Memory 115 (or sufficient space in the section of Memory 115 that is allocated for the requesting application or LPAR), the method 500 proceeds to block 525, where the Memory Expansion Component 135 identifies a page to transfer to Extended Memory 120. In one embodiment, this identification is based on identifying the oldest page in Memory 115 (i.e., the page that has been in Memory 115 the longest). In a related embodiment, this determination involves identifying any page that is older than a predefined or dynamic threshold. In some embodiments, this determination is based on identifying a page that has not been accessed for a predefined period of time. Of course, in various embodiments, this identification can be based on various other factors.

Once a page has been identified to transfer to Extended Memory 120, the method 500 proceeds to block 530, where the Memory Expansion Component 135 transfers the identified page to Extended Memory 120. In embodiments, this may entail calling one or more optimized APIs of the Interface 220, as discussed in reference to FIG. 4 above. Once this transfer has been completed and the call returned, the method 500 proceeds to block 535, where the Memory Expansion Component 135 transfers the requested page into Memory 115. Similarly, as discussed above, this may entail calling the Interface 220 with a reference to the desired page. When this returns, the segment or page address is returned to the requesting entity and the method 500 terminates at block 540.

Figure 6:
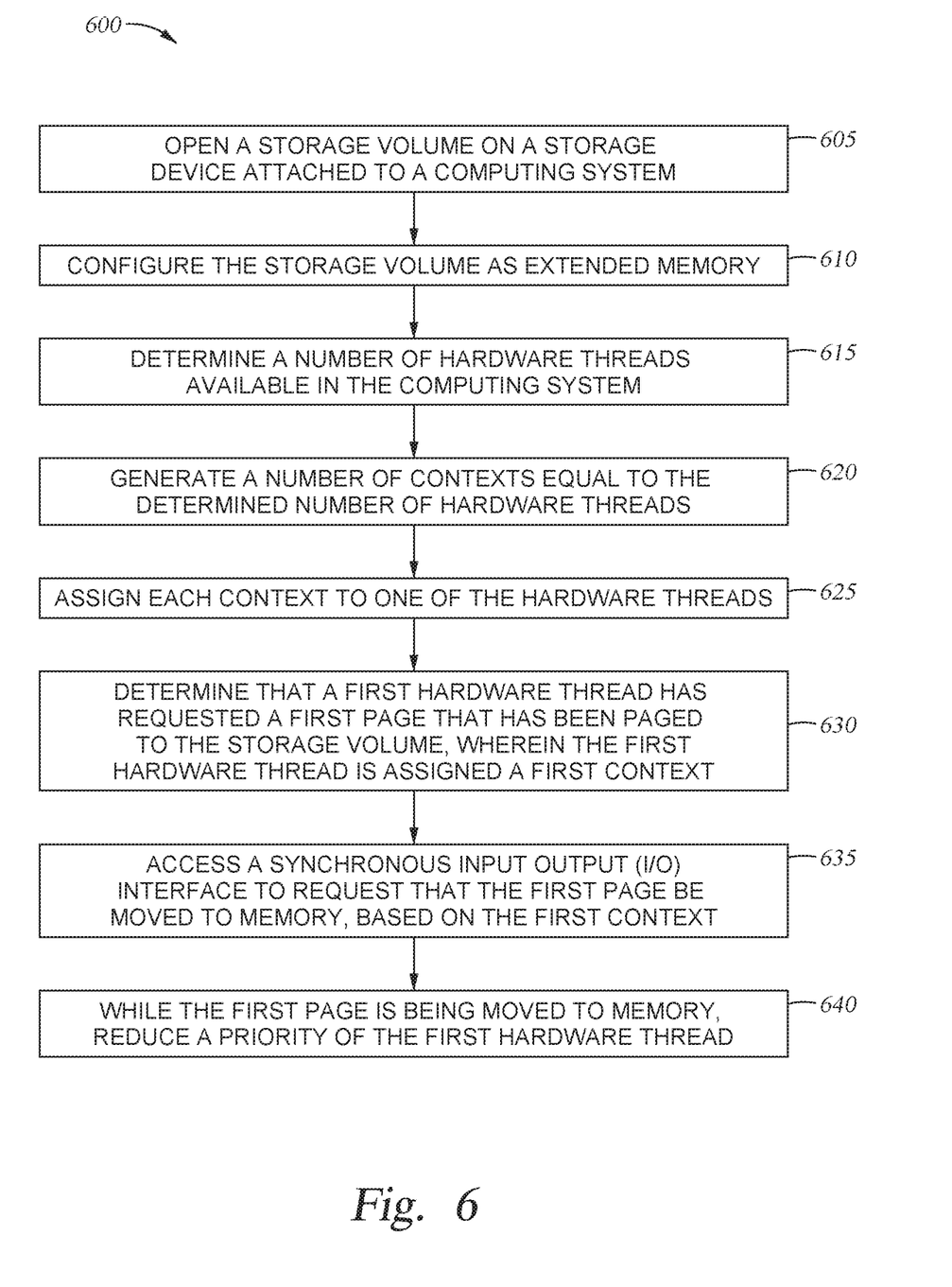
FIG. 6 is a flow diagram illustrating a method of extending system memory, according to one embodiment disclosed herein.

FIG. 6 is a flow diagram illustrating a method 600 of extending system memory, according to one embodiment disclosed herein. The method 600 begins at block 605, where the Memory Manager 133 opens a storage volume on a storage device attached to a computing system. At block 610, the Memory Manager 133 configures the storage volume as extended memory. The method 600 then proceeds to block 615, where a number of hardware threads available in the computing system is determined. At block 620, a number of contexts are generated, where the number of contexts equals the determined number of hardware threads, and at block 625, each context is assigned to one of the hardware threads. The method 600 then continues to block 630, where Memory Manager 133 determines that a first hardware thread has requested a first page that has been paged to the storage volume, wherein the first hardware thread is assigned a first context. At block 635, the Memory Manager 133 accesses a synchronous input output (I/O) interface to request that the first page be moved to memory, based on the first context. Finally, at block 640, a priority of the first hardware thread is reduced while the first page is being moved to memory.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access various applications or related data available in the cloud. Doing so allows a user to access this information from any computing system attached to a network connected to the cloud (e.g., the Internet). In order to improve the performance of such cloud applications, the servers may utilize embodiments of the present disclosure to extend the memory of the devices. As discussed above, this improves the functioning of the servers themselves, and further improves the performance of any applications operating on the servers, which in turn improves the services provided to users, customers, and clients of the cloud system.

While the foregoing is directed to embodiments of the present invention, other and further embodiments of the invention may be devised without departing from the basic scope thereof, and the scope thereof is determined by the claims that follow.

What is claimed is:

1. A method comprising:
   opening a storage volume on a storage device attached to a computing system;
   configuring the storage volume as extended memory;
   determining a number of hardware threads available in the computing system;
   generating a number of contexts equal to the determined number of hardware threads;
   assigning each context to one of the hardware threads;
   determining that a first hardware thread has requested a first page that has been paged to the storage volume, wherein the first hardware thread is assigned a first context;
   determining that a second page should be moved from memory to the storage volume, based on determining that the first hardware thread has requested access to the first page that is stored in the storage volume;
   accessing a synchronous input output (I/O) interface to request that the second page be moved to the storage volume;

accessing the synchronous I/O interface to request that the first page be moved to memory, based on the first context; and while the first and second pages are being moved, reducing a priority of the first hardware thread.

2. The method of claim 1, further comprising:

determining that a third page should be moved from memory to the storage volume, based on a request from a second hardware thread;

accessing the synchronous I/O interface to request that the third page be moved to the storage volume, based on a second context corresponding to the second hardware thread; and while the third page is being moved to the storage volume, reducing a priority of the second hardware thread.

3. The method of claim 1, wherein each respective context includes a respective queue pair and a segment table.

4. The method of claim 3, wherein moving the first page to memory is based at least in part on the segment table.

5. The method of claim 3, wherein the segment table is generated upon opening of the storage volume, and wherein the segment table includes a mapping between virtual addresses and physical addresses in memory.

6. The method of claim 1, wherein the storage device is attached via a coherent accelerator processor interface (CAPI).

7. The method of claim 1, wherein configuring the storage volume as extended memory comprises configuring the storage volume to provide an optimized kernel interface.

8. The method of claim 7, wherein the optimized kernel interface does not include traditional I/O functionality.

9. A computer program product comprising:

a computer-readable storage medium having computer-readable program code embodied therewith, the computer-readable program code executable by one or more computer processors to perform an operation comprising:

opening a storage volume on a storage device attached to a computing system;

configuring the storage volume as extended memory;

determining a number of hardware threads available in the computing system;

generating a number of contexts equal to the determined number of hardware threads;

assigning each context to one of the hardware threads;

determining that a first hardware thread has requested a first page that has been paged to the storage volume, wherein the first hardware thread is assigned a first context;

determining that a second page should be moved from memory to the storage volume, based on determining that the first hardware thread has requested access to the first page that is stored in the storage volume;

accessing a synchronous input output (I/O) to request that the second page be moved to the storage volume;

accessing the synchronous I/O interface to request that the first page be moved to memory, based on the first context; and while the first and second pages are being moved, reducing a priority of the first hardware thread.

10. The computer program product of claim 9, the operation further comprising:

determining that a third page should be moved from memory to the storage volume, based on a request from a second hardware thread;

accessing the synchronous I/O interface to request that the third page be moved to the storage volume, based on a second context corresponding to the second hardware thread; and while the third page is being moved to the storage volume, reducing a priority of the second hardware thread.

11. The computer program product of claim 9, wherein each respective context includes a respective queue pair and a segment table, and wherein moving the first page to memory is based at least in part on the segment table.

12. The computer program product of claim 11, wherein the segment table is generated upon opening of the storage volume, and wherein the segment table includes a mapping between virtual addresses and physical addresses in memory.

13. The computer program product of claim 9, wherein the storage device is attached via a coherent accelerator processor interface (CAPI).

14. The computer program product of claim 9, wherein configuring the storage volume as extended memory comprises configuring the storage volume to provide an optimized kernel interface that does not include traditional I/O functionality.

15. A system comprising:

one or more computer processors; and a memory containing a program which when executed by the one or more computer processors performs an operation, the operation comprising:

opening a storage volume on a storage device attached to a computing system;

configuring the storage volume as extended memory;

determining a number of hardware threads available in the computing system;

generating a number of contexts equal to the determined number of hardware threads;

assigning each context to one of the hardware threads;

determining that a first hardware thread has requested a first page that has been paged to the storage volume, wherein the first hardware thread is assigned a first context;

determining that a second page should be moved from memory to the storage volume, based on determining that the first hardware thread has requested access to the first page that is stored in the storage volume;

accessing a synchronous input output (I/O) interface to request that the second page be moved to the storage volume;

accessing the synchronous I/O interface to request that the first page be moved to memory, based on the first context; and while the first and second pages are being moved, reducing a priority of the first hardware thread.

16. The system of claim 15, the operation further comprising:

determining that a third page should be moved from memory to the storage volume, based on a request from a second hardware thread;

accessing the synchronous I/O interface to request that the third page be moved to the storage volume, based on a second context corresponding to the second hardware thread; and while the third page is being moved to the storage volume, reducing a priority of the second hardware thread.

17. The system of claim 15, wherein each respective context includes a respective queue pair and a segment table, and wherein moving the first page to memory is based at least in part on the segment table.

18. The system of claim 17, wherein the segment table is generated upon opening of the storage volume, wherein the segment table includes a mapping between virtual addresses and physical addresses in memory.

19. The system of claim 15, wherein the storage device is attached via a coherent accelerator processor interface (CAPI), and wherein configuring the storage volume as extended memory comprises configuring the storage volume to provide an optimized kernel interface that does not include traditional I/O functionality.

* * * * *